United States Patent [19]

Morris

[11] Patent Number: 5,316,556
[45] Date of Patent: May 31, 1994

[54] APPARATUS AND METHOD FOR EXTRUDING SHEAR THINNING MATERIAL

[75] Inventor: Jerry L. Morris, San Jose, Calif.

[73] Assignee: Valence Technology, Inc., San Jose, Calif.

[21] Appl. No.: 40,225

[22] Filed: Mar. 30, 1993

[51] Int. Cl.$^5$ ............... H01M 6/18; H01M 6/50
[52] U.S. Cl. .................. 29/623.3; 264/104; 264/105; 264/211.11; 425/207; 425/208; 425/382.3; 425/461; 429/191
[58] Field of Search ............ 264/211.11, 104, 105, 264/129; 429/191, 192, 218; 425/206–209, 382.3, 461

[56] References Cited

U.S. PATENT DOCUMENTS

| | | | |
|---|---|---|---|
| 3,655,585 | 4/1972 | Dey et al. | 264/105 |
| 4,168,942 | 9/1979 | Firth | 425/208 |
| 4,209,479 | 6/1980 | Gunther et al. | 264/104 |
| 4,423,124 | 12/1983 | Dey | 264/104 |
| 4,659,528 | 4/1987 | Plowman et al. | 264/105 |
| 4,790,969 | 12/1988 | Bailey et al. | 264/105 |
| 4,822,548 | 1/1989 | Hempel | 425/382.3 |
| 4,925,751 | 5/1990 | Shackle et al. | 429/191 |
| 4,976,904 | 12/1990 | Bilhorn | 425/382.3 |
| 5,158,722 | 10/1992 | Ilic et al. | 264/104 |

FOREIGN PATENT DOCUMENTS 63-27229  2/1988  Japan ................. 264/105

Primary Examiner—Jeffery Thurlow
Attorney, Agent, or Firm—Robert E. Krebs

[57] ABSTRACT

In the manufacture of a battery cell, a shear thinning cathode material that has been mixed to a homogeneous state is transported to an extrusion opening while being subjected to a non-decreasing shear stress. The shear thinning cathode material is extruded onto a conductive substrate material at a constant rate. An electrolyte material is applied over the shear thinning cathode material, and an anode material is applied over the electrolyte material.

18 Claims, 4 Drawing Sheets

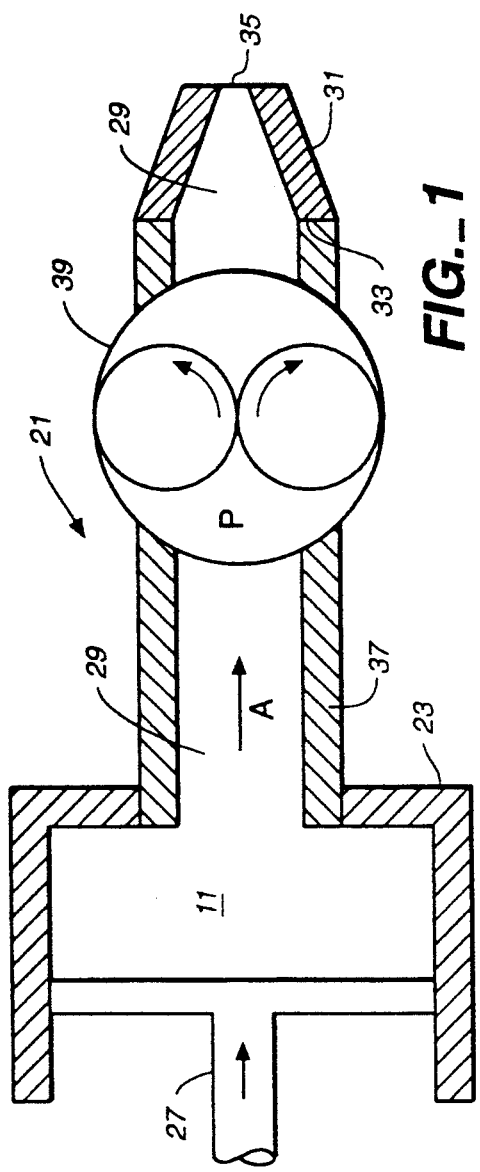
FIG._1
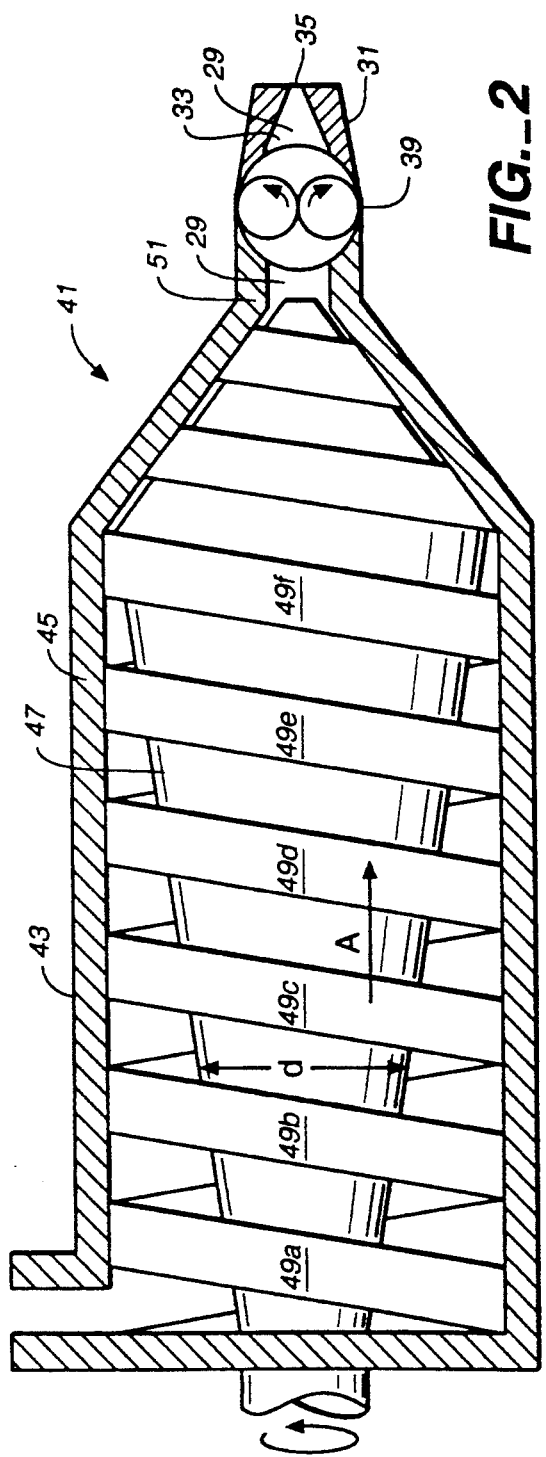
FIG._2

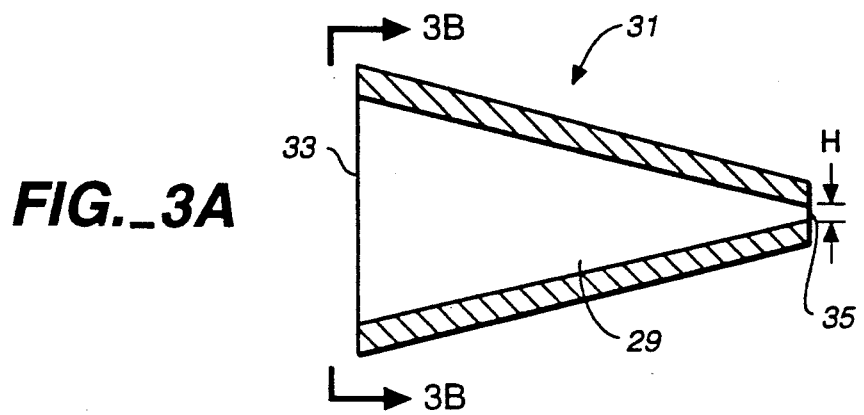
FIG._3A
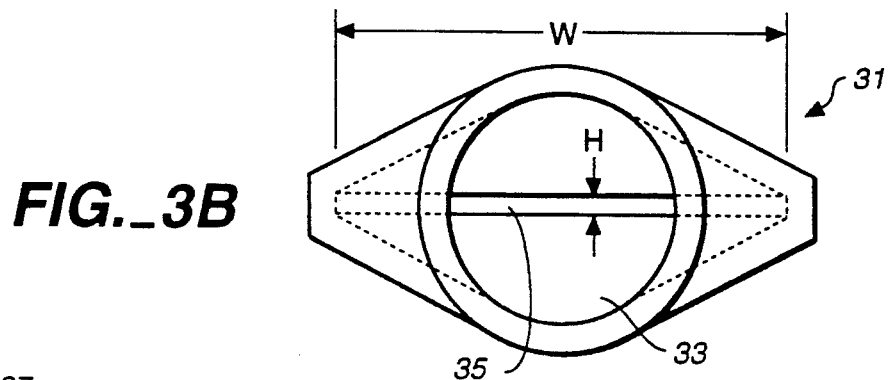
FIG._3B
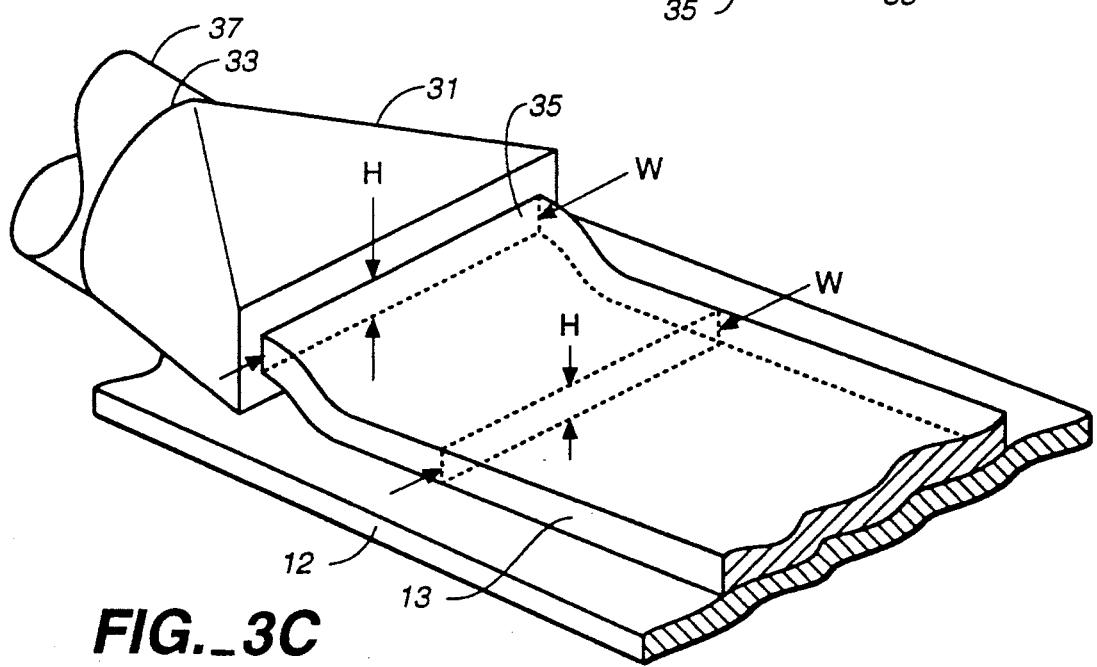
FIG._3C

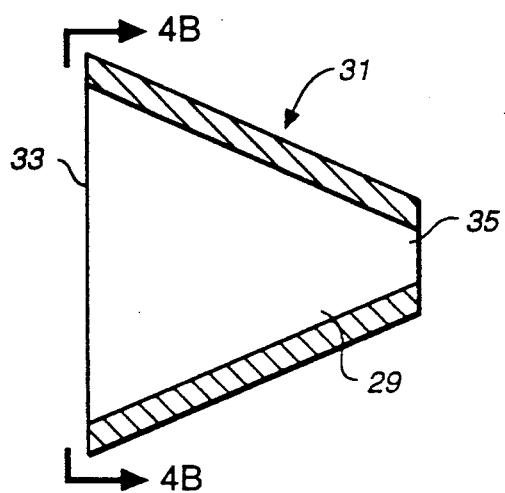
FIG._4A
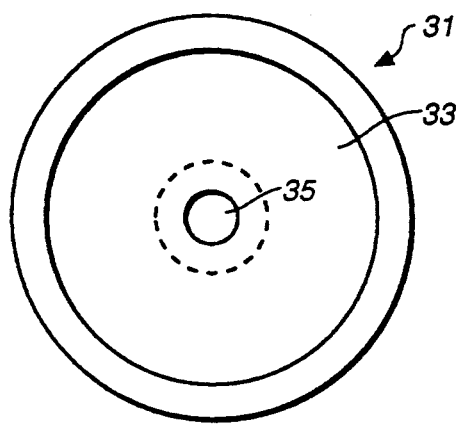
FIG._4B
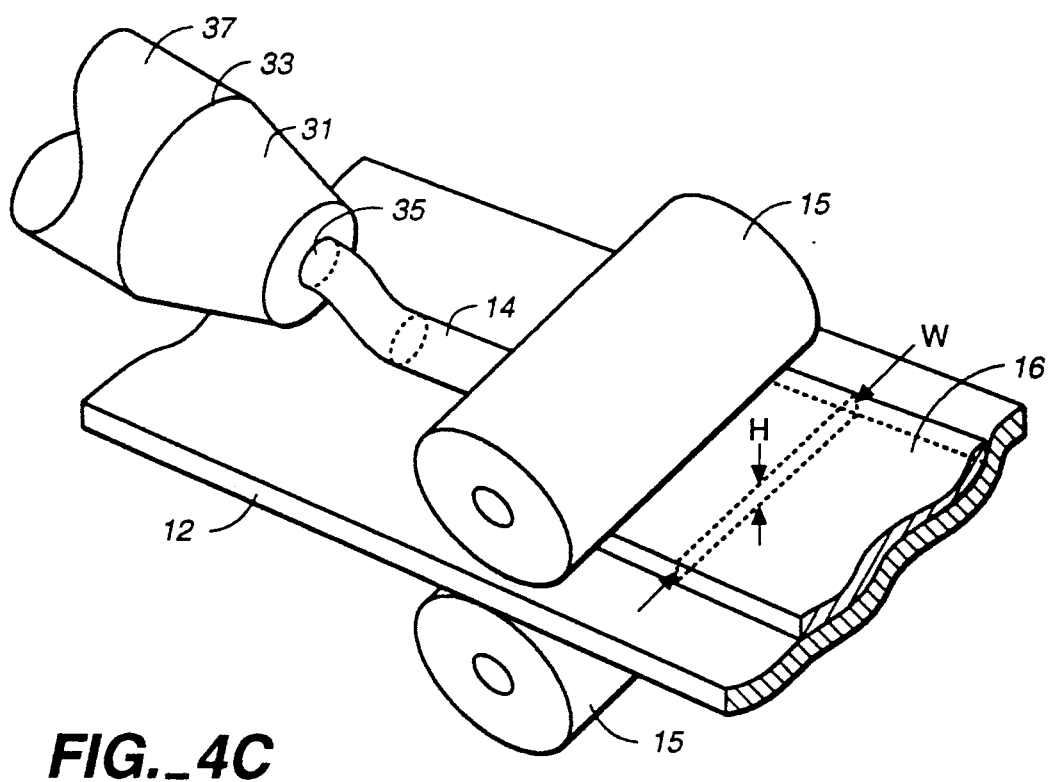
FIG._4C

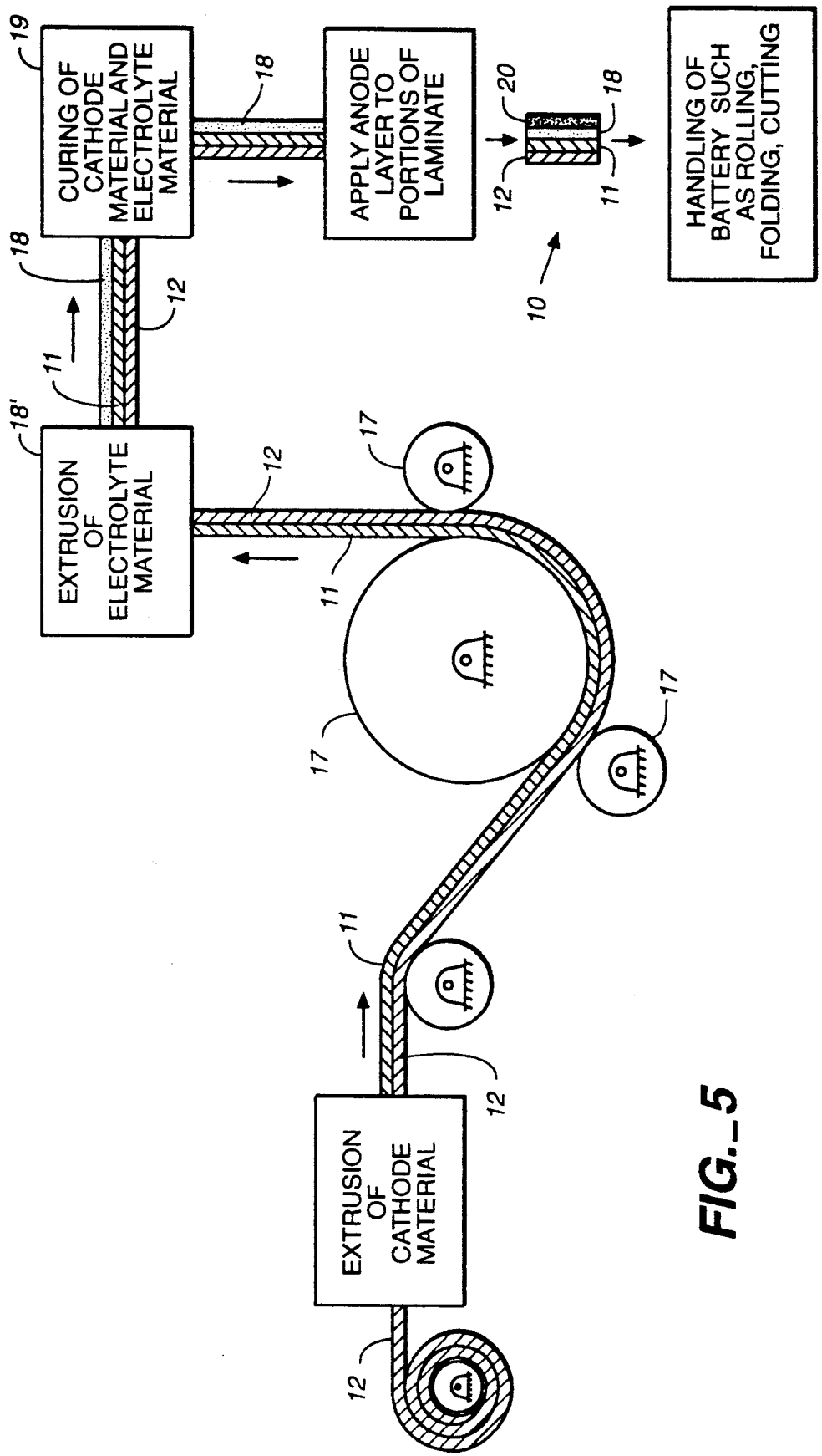
FIG._5

APPARATUS AND METHOD FOR EXTRUDING SHEAR THINNING MATERIAL

BACKGROUND OF THE INVENTION

1. FIELD OF THE INVENTION

The present invention relates to an apparatus and method for extruding and, more particularly, to an apparatus and method for extruding a shear thinning material.

2. STATE OF THE ART

In recent years, workers in the battery art have begun to understand and recognize the advantages of batteries manufactured from laminates including solid polymer electrolytes and sheet-like anodes and cathodes over conventional liquid electrolyte batteries. The advantages include lower battery weights than batteries that employ liquid electrolytes, longer service life, relatively high power densities, relatively high specific energies, and the elimination of the danger associated with batteries containing spillable liquid electrolytes such as acids. Until recently, commercial use of such batteries was limited by, among other things, the inability of such batteries to operate effectively except at relatively high temperatures.

More recently, however, laminate batteries using polymer electrolytes have been developed which possess good performance characteristics at or below room temperature. For example, in U.S. Pat. No. 4,925,751 to Shackle et al., a battery cell is described having good performance characteristics across a broad range of temperatures, including room temperature. The battery cell utilizes a current collector, such as a sheet of conductive metal foil, upon which is coated a thin layer, generally between 25 and 250 microns, of a cathode material.

The cathode material described, for example, in U.S. Pat. No. 4,925,751 to Shackle et al., is formed from a mixture of active cathodic material (usually a $V_3O_8$ or a $V_6O_{13}$ material), a conductive filler material (usually carbon particles), and an ionically conductive electrolyte material. In practice, such cathode material is paste-like in consistency and coating on the current collector is performed by conventional coating techniques such as a doctor blade or an extrusion method. The cathode material exhibits non-Newtonian fluid characteristics. Particularly, the cathode material is a shear thinning material, i.e., its viscosity decreases as the material is subjected to increasing shear stress. In still other words, the flow resistance of such materials decrease as shear increases. Apparatuses and methods for extruding a shear thinning cathode material must, therefore, be designed to accommodate this fluid characteristic.

In conventional mixing and extruding systems, a material is mixed to a homogeneous state and then is transported by a positive displacement pumping mechanism. The positive displacement pumping mechanisms typically transport the material under pressure through a narrow conduit to a reservoir having a larger cross-sectional area than the conduit. From the reservoir, the material is extruded through an extruder nozzle. In such systems, even if the rate of transport of the homogeneous material is somewhat irregular, the reservoir provides a consistent rate of extrusion.

Where, however, a shear thinning material is being mixed and extruded in such an apparatus, transport of the shear thinning material is substantially stopped when the material ceases to be under constant or increasing shear, i.e., when the homogeneous shear thinning material is expanded into the larger volume of the reservoir. In production of laminate batteries, it is necessary to achieve a constant thickness electrode laminate layer on a substrate to attain acceptable results in a battery and, consequently, a shear thinning electrode material must be extruded onto a substrate at a substantially constant rate. It is, therefore, desirable to provide an apparatus and method for mixing and extruding a shear thinning electrode material for a laminate battery in which electrode material is mixed to a homogeneous state and then transported while undergoing a constant or increasing shear to a point of extrusion such that it is extruded at a constant rate.

SUMMARY OF THE INVENTION

The present invention, generally speaking, provides an apparatus and a method for extruding shear thinning electrode materials.

In accordance with one aspect of the present invention, an apparatus for extruding a shear thinning material is provided. The apparatus includes a source of shear thinning material. The apparatus is further provided with a nozzle having an opening at one end through which the homogeneous shear thinning material is extruded. Means are provided for transporting the homogeneous shear thinning material from the source of shear thinning material and out the opening of the nozzle. The apparatus is further provided with a passage, at least a portion of which extends through the nozzle, through which the shear thinning material travels from the source of shear thinning material to the opening of the nozzle, the passage having a non-increasing cross-sectional area.

In accordance with another aspect of the present invention, a method for extruding a shear thinning material is described. The homogeneous shear thinning material is transported from a source of homogeneous shear thinning material to an extrusion opening while subjecting the homogeneous shear thinning material to a non-decreasing shear stress. The shear thinning material is extruded through the extrusion opening at a substantially constant rate.

In accordance with yet another aspect of the present invention, a method for manufacturing a laminate battery comprises the step of transporting a homogeneous shear thinning cathode material comprised of an active cathodic material, a conductive filler material, and an electrolyte material from a source of shear thinning material to an extrusion opening while subjecting the homogeneous shear thinning material to a non-decreasing shear stress. The homogeneous shear thinning cathode material is extruded through the extrusion opening at a substantially constant rate. A layer of shear thinning cathode material is formed on a conductive substrate material. Electrolyte material is applied over the layer of shear thinning cathode material to form an electrolyte layer. Anode material is applied over the electrolyte layer.

BRIEF DESCRIPTION OF THE DRAWINGS

The present invention can be further understood with reference to the following description in conjunction with the appended drawings, wherein like elements are provided with the same reference numerals. In the drawings:

FIG. 1 is a cross-sectional diagram of a portion of an extruder for use with a batch shear thinning cathode material production system according to one embodiment of the present invention;

FIG. 2 is a cross-sectional diagram of an extruder for use with a batch shear thinning cathode material production system according to another embodiment of the present invention;

FIG. 3A is a cross-sectional, side view of a nozzle for use with an extruder according to the present invention;

FIG. 3B is a rear view, taken at section 3B—3B for viewing in the direction of the arrows, of the nozzle of FIG. 3A;

FIG. 3C is a perspective view of an extrusion formed by the extruder of FIGS. 3A and 3B;

FIG. 4A is a cross-sectional view of a nozzle for use with an extruder according to another embodiment of the present invention;

FIG. 4B is a rear view, taken at section 4B—4B for viewing in the direction of the arrows, of the nozzle of FIG. 4A;

FIG. 4C is a perspective view of an extrusion formed by the extruder of FIGS. 4A and 4B; and FIG. 5 is a side view of an apparatus for forming a laminate battery according to the present invention.

DETAILED DESCRIPTION OF THE PREFERRED EMBODIMENTS

With reference to FIG. 1, there is shown an apparatus 21 for extruding a shear thinning material onto a substrate. As shown, for example, in FIGS. 3C and 4C, the shear thinning material can be a cathode material 11 and the substrate can be a current collector sheet or web 12 of a laminate battery 10. The cathode material 11 preferably includes an active cathodic material, a conductive filler material, and an electrolyte material such as are described in U.S. Pat. No. 4,925,751 to Shackle, the disclosure of which is hereby incorporated by reference to the extent that such materials are disclosed.

In practice, the apparatus 21 of FIG. 1 extrudes cathode material 11 that is produced in a batch process. The cathode material 11 is mixed in a means including a chamber 23 of the apparatus by a mixer, such as a double planetary mixer (not shown). The mixer is removed from the chamber 23 and a plunger or piston 27 is driven into the chamber to compress the cathode material and to thereby transport the cathode material out of the chamber. The cathode material 11 is transported through a passage 29 extending from the chamber 23 to an extruder nozzle 31 that communicates, at one end 33, by means of the passage, with the chamber. The cathode material 11 is extruded through the extrusion opening 35 at the other end of the nozzle 31 at a constant rate.

At least a portion of the passage 29 extends through the nozzle 31, from the first end 33 to the extrusion opening 35. The cross-sectional area of the passage 29 decreases or remains constant in the direction from the chamber 23, the point at which the cathode material 11 is formed into a homogeneous mixture, to the extrusion opening 35 of the nozzle 31, i.e., its cross-sectional area is non-increasing. The non-increasing cross-sectional area of the passage 29 facilitates flow of the shear thinning cathode material 11 in the passage, in that the cathode material is either under constant shear or increasing shear, depending upon whether the cross-sectional area of the passage is constant or decreasing, respectively. The passage 29 may be formed with portions that are of a constant cross-section and portions that are of a decreasing cross-section. Portions of the passage 29 may, for example, be formed from conventional pipe 37 having a constant cross-sectional area.

A pump, preferably a metering pump 39, is preferably placed in line in the passage 29 to further facilitate transport of the cathode material 11. In a particularly preferred embodiment, the metering pump is a gear pump. The speed of the metering pump 39 may be varied to adjust the amount of cathode material 11 that is extruded through the extrusion opening 35 of the nozzle 31. Further, the force with which the plunger or piston 27 compresses the cathode material 11 may be increased or decreased to adjust the amount of cathode material that is extruded through the extrusion opening 35 of the nozzle 31.

To transport most known shear thinning cathode materials 11, the plunger or piston 27 must develop pressures of approximately 500 psi. While the metering pump 39 is not necessary to the functioning of the apparatus 21, it is preferred, at least in part because it is able to accommodate pressure drops in the cathode material as it travels in an advancing direction A to the extrusion opening 35 of the nozzle 31.

FIG. 2 shows an apparatus 41 that extrudes cathode material that is produced in a continuous process. A means for mixing includes a screw mixing device 43 that includes a barrel 45 and a screw 47. The screw 47 is formed with a thread 49. The shape of the screw 47 is such that a void volume between successive turns 49$a$, 49$b$, . . . , 49$n$ of the thread and the barrel 45 is non-increasing in the advancing direction A to facilitate transport of the shear thinning cathode material 11 in the advancing direction by ensuring a non-decreasing shear stress. The screw 47 is generally formed with a progressively larger minor diameter d in the advancing direction A, such that the void volume is non-increasing or decreasing or constant, to facilitate self feeding of the materials for producing the cathode material and to thereby facilitate transport of material from the screw mixing device 43 so that it is extruded at a constant rate.

The passage 29 communicates with a forward end 51 of the barrel 45 so that, as with the batch apparatus 21, the cathode material 11 is transported through the passage with a non-increasing cross-sectional area at least from the point at which the material is formed into a homogeneous mixture. As noted above, the entire apparatus 41, including the screw mixing device 43, is preferably shaped with a non-increasing cross-sectional area. Again, a portion of the passage 29 extends through the nozzle 31 and a gear pump 39 may be provided to facilitate the transport of cathode material 11 through the passage and through the extrusion opening 35 of the nozzle. Again, if desired, the gear pump 39 may be omitted and the cathode material 11 may be extruded through the extrusion opening 35 of the nozzle 31 by pressure developed by the screw mixing device 43.

As shown in FIGS. 3A, 3B, and 3C, the nozzle 31 is preferably a slot die type of extruder nozzle. As shown in FIG. 3C the extrusion opening 35 is of substantially the same width W as the sheet-like cathode material layer 13 that is desired to be formed on the web or sheet 12, as well as being of substantially the same height H as the thickness of the cathode material layer that is desired to be formed on the web or sheet.

As shown in FIGS. 4A, 4B, and 4C, however, the nozzle 31 may be formed with a substantially circular extrusion opening 35, or any other desired shape. As shown in FIG. 4C, the substantially circular, or other desired shape, extrusion opening 35 forms an extrusion in the shape of a substantially circular bead 14, or other desired shape, of cathode material 11 on the web or sheet 12. The substantially circular bead 14, or other desired shape, is then compressed between two or more rollers 15 to form a layer 16 of desired width W and thickness H.

Whether a layer 16 is formed by compressing a bead 14 that is extruded from a substantially circular extrusion opening 35 of a nozzle 31, or whether a layer 13 of cathode material is extruded directly onto a conductive web 12 from a slot die type of extruder, the cathode material layer on the conductive web is preferably compressed, such as by rollers 17, to form a highly smooth surface. Thereafter, as shown in FIG. 5, a layer of electrolyte material 18 is applied, preferably by an extruder 18', on top of the layer of cathode material 11. Because the cathode material layer on the web 12 is highly smooth, the electrolyte material 18, which has a significantly lower viscosity than the cathode material 11, can form a smooth layer of electrolyte material. The electrolyte material 18 and the cathode material 11 are preferably cured together by an electron beam apparatus 19. Preferably after the laminate including the conductive web 12, the cathode material layer 11, and the electrolyte material 18 is processed into some desired shape, such as a sheet or web, one or more sheets or webs of anode material 20, which is preferably a conductive web material with lithium deposited on its surfaces, is applied in a layer on top of at least portions of the electrolyte material 18. The assembly including cathode material 11, electrolyte material 18, and anode material 20 is a laminate battery 10, and the laminate battery may be folded, rolled, or otherwise handled to form a battery of a desired shape and size.

Cathode material 11 is extruded on a web or sheet 12 by a method wherein an active cathodic material, a conductive filler material, and an electrolyte material that have been intimately mixed to a homogeneous state to form the cathode material, is transported from the source of homogeneous cathode material, which may be the chamber 23 in which a batch of cathode material is prepared by the mixer, or the screw mixing device 43 for preparing the cathode material in a continuous process, through the passage 29 having a non-increasing cross-sectional area in an advancing direction A of the batch apparatus 21 or the continuous apparatus 41 to the extrusion opening 35. Transport of the homogeneous shear thinning cathode material 11 through the non-increasing cross-sectional area of the passage 29 subjects the cathode material to a non-decreasing shear stress. The cathode material 11 is transported, at least in part in the batch apparatus 21, by a plunger or piston 27. In the continuous mixing apparatus 41, the cathode material 11 is transported, at least in part, by the screw mixing device 43. The cathode material 11 is preferably also transported through the passage 29 by a metering pump 39. The plunger or piston 27 or the screw mixing device 43 and the metering pump 39 facilitate transport of the cathode material 11 to the extrusion opening 35 at a substantially constant volume flow rate so that extrusion occurs at a constant rate.

The cathode material 11 is then extruded, at a substantially constant volume flow rate, through the extrusion opening 35 of the nozzle 31 in communication with the chamber 23 of the batch apparatus 21, or the screw mixing device 43 of the continuous apparatus 41, and onto the web or sheet 12. The cathode material 11 is preferably extruded from the extrusion opening 35 of the nozzle 31 in the form of a sheet-like layer 13 having substantially the same width W and height H characteristics as the extrusion opening and having the width and thickness characteristics desired on the web or sheet 12. The cathode material 11 may, however, be extruded from a circular, or other desired shape, extrusion opening 35 in the form of a bead 14. The bead 14 is then compressed between two or more rollers 15 to form a layer 16 having desired width W and height H characteristics.

The cathode material 11 that forms a layer 13 or a layer 16 is preferably further compressed such that it forms a smooth layer on the web or sheet 12. Electrolyte material 18 is applied, preferably by an extruder 18' which may be a slot and die type extruding apparatus (not shown), over the smooth layer of cathode material 11 to form an electrolyte layer. The cathode material 12 and electrolyte material 18 are cured in an electron beam curing apparatus 19. Anode material 20 is applied over at least portions of the electrolyte layer 18.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

I claim:

1. An apparatus for extruding a shear thinning material, comprising:
    a source of homogeneous shear thinning material;
    a nozzle having an opening at one end through which the homogeneous shear thinning material is extruded;
    means for transporting the homogeneous shear thinning material from the source of shear thinning material and out the opening of the nozzle; and
    a passage, at least a portion of which extends through the nozzle, through which passage the shear thinning material travels from the source of shear thinning material to the opening of the nozzle, the passage having a non-increasing cross-sectional area arranged to subject all material traveling through the passage to a non-decreasing shear, the portion of the passage extending through the nozzle having a decreasing cross-sectional area.

2. The apparatus according to claim 1, wherein a portion of the passage prior to the portion extending through the nozzle has a constant cross-sectional area.

3. The apparatus according to claim 1, wherein a portio of the passage prior to the portion extending through the nozzle has a decreasing cross-sectional area.

4. The apparatus according to claim 1, wherein the transporting means includes a piston for compressing the shear thinning electrode material through an opening in the chamber.

5. The apparatus according to claim 1, wherein the transporting means includes a screw conveyor.

6. The apparatus according to claim 1, wherein the transporting means includes a metering pump.

7. The apparatus according to claim 1, wherein the opening of the nozzle is shaped to extrude a bead of shear thinning material.

8. The apparatus according to claim 1, wherein the opening of the nozzle is shaped to extrude a sheet of shear thinning material.

9. A method for extruding a shear thinning material, comprising the steps of:

transporting a homogeneous shear thinning material through a passage from a source of homogeneous shear thinning material to an extrusion opening of a nozzle while subjecting the homogeneous shear thinning material to a non-decreasing shear stress, the homogenous shear thinning material being transported from the source to the nozzle through a first portion of the passage having a non-increasing cross-sectional area, the homogenous shear thinning material being transported from the first portion of the passage to the extrusion opening through a portion of the passage in the nozzle having a decreasing cross-sectional area while being subjected to an increasing shear stress; and extruding the homogenous shear thinning material through the extrusion opening at a substantially constant rate.

10. A method for manufacturing a laminate battery, comprising the steps of:

transporting a homogeneous shear thinning cathode material comprised of an active cathodic material, a conductive filler material, and an electrolyte material from a source of homogenous shear thinning material to an extrusion opening of a nozzle while subjecting the homogeneous shear thinning cathode material to a non-decreasing shear stress;

transporting the homogenous shear thinning cathode material through the nozzle while subjecting the homogenous shear thinning material to an increasing shear stress;

extruding the homogeneous shear thinning cathode material through the extrusion opening at a substantially constant rate;

forming a layer of the homogeneous shear thinning cathode material on a conductive substrate material;

applying electrolyte material over the layer of homogeneous shear thinning cathode material to form an electrolyte layer; and applying anode material over the electrolyte layer.

11. The method set forth in claim 9, wherein said source of homogeneous shear thinning material includes a mixing chamber;

the transporting step comprising transporting the homogeneous shear thinning material from the chamber to the extrusion opening.

12. The method set forth in claim 9, wherein the transporting step is performed by compressing the batch of homogeneous shear thinning material with a piston.

13. The method set forth in claim 9, wherein at least a portion of the transporting step is performed by a screw conveyor.

14. The method set forth in claim 9, wherein at least a portion of the transporting step is performed by a metering pump.

15. The method set forth in claim 9, wherein the shear thinning material is extruded from the opening in the form of a bead.

16. The method set forth in claim 9, wherein the shear thinning material is extruded from the opening in the form of sheet.

17. The method set forth in claim 9, wherein the first portion of the passage is formed with a constant cross-sectional area.

18. The method set forth in claim 9, wherein the first portion of the passage is formed with a decreasing cross-sectional area.

* * * * *